C. A. PALMGREN.
TOOL.
APPLICATION FILED OCT. 11, 1916.

1,285,350.

Patented Nov. 19, 1918.

Witness
L. B. Graham

Inventor:
Charles A. Palmgren,
by Adams & Jackson.
Attys.

UNITED STATES PATENT OFFICE.

CHARLES A. PALMGREN, OF CHICAGO, ILLINOIS.

TOOL.

1,285,350.  Specification of Letters Patent.  Patented Nov. 19, 1918.

Application filed October 11, 1916. Serial No. 125,068.

*To all whom it may concern:*

Be it known that I, CHARLES A. PALMGREN, a citizen of the United States, and a resident of Chicago, in the county of Cook and State of Illinois, have invented certain new and useful Improvements in Tools, of which the following is a specification, reference being had to the accompanying drawings.

My invention relates to cutting and boring tools and particularly to those designed for working in metal, although it may be applied to tools used for working on other materials. It has for its object to provide a new and improved milling tool for cutting an annular channel about a predetermined axis in a block or billet of steel preparatory to using a hollow drill in such channel to form an elongated core which may subsequently be removed for purposes of analysis. In the steel industry, steel required for use in many lines of manufacture must come up to certain specified standards, and in order to ascertain the suitability of the steel for the uses to which it is to be put, it is customary to make frequent tests of the quality of the steel. For the purpose of making these tests, it is customary to remove samples of different parts of a mass or billet of steel, and among other ways of obtaining the desired samples it has been proposed to bore into the steel billet by means of a hollow drill so as to form a cylindrical core which may be afterward removed and tested or analyzed. As such masses of steel usually have rough or unfinished surfaces and the sample to be obtained must be taken at the point indicated by the inspector, it is frequently very difficult to bore at the point indicated, owing to the fact that the roughness of the surface interferes with starting the drill. To provide a suitable starting place for the drill, it has been proposed to employ a hollow end mill to cut an annular channel of the proper size to receive the hollow drill subsequently used, but such hollow end mills as heretofore constructed have not been much better adapted to starting in a rough surface than the hollow drill itself, although they have been provided with a centering pin designed to hold the mill in the proper position. Such centering pin, however, has not been adequate for the purpose of maintaining the concentricity of the channel cut with a predetermined axis which coincides with the axis of the core to be cut, because, owing to the roughness of the surface operated upon, the engagement of the teeth of the mill with the roughnesses of such surface, and the fact that the centering pin is necessarily yieldingly projected by spring pressure, the mill would shift from its initial position and the bore would not be made with the necessary accuracy. Consequently such mills have not been successful, and so far as I am aware, no satisfactory tool for the purpose has been produced prior to that which forms the subject-matter of this application. The latter overcomes all the objections to prior devices of the kind, and fully meets all the requirements of the work for which it is designed.

My improved tool comprises a head having a suitable shank by which it may be mounted in a drill press, or other suitable machine, and rotated at a suitable speed. At the outer or operating face of the head are provided a plurality of cutting teeth arranged equidistant from the axis of the head, the head being bored centrally so that such teeth are adapted to cut an annular channel. In the central bore of the head is mounted a pointed centering pin, which is resiliently projected beyond the operating face of the head by a spring mounted in the head back of the pin and disposed around the stem thereof. The parts thus far described are not new. My invention consists in providing a tool such as that described with supplementary means for holding the head in position to maintain the concentricity of the channel cut by the teeth with a predetermined axis, such means consisting of supplementary teeth which are carried by the cutting teeth before mentioned and project a short distance beyond the same. Such supplementary teeth are also equidistant from the axis of the head, and consequently by reason of the fact that they project beyond the cutting edges of the main teeth, they engage the material to be drilled first and act to cut an annular channel therein which is concentric with the predetermined axis of the core to be cut. These supplementary teeth are best made V-shape in cross-section, as the teeth may in that way be made stronger, and the channel cut by them is of corresponding shape in cross-section. When the tool is used, the centering pin is, of course, forced back into its socket until it projects only as far as the points of the supplementary teeth, so that when the tool is applied to the mass of steel to be bored the supplementary teeth first cut the supplementary channel, and as the tool enters the material, the main cutting teeth finally come into operation and cut the main channel, which is to receive the hollow drill by which the core is formed. The axis of the core to be cut is marked by a center punch in the usual way, and the centering pin is then placed at that point. Consequently, when the tool is rotated, the supplementary teeth coöperate with the centering pin to hold the tool properly in position, since the supplementary channel keeps the tool from slipping sidewise while the main teeth are biting into the material.

In the accompanying drawings,—

Figure 1:
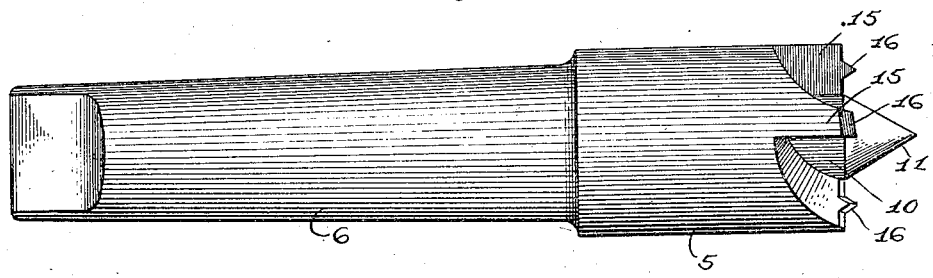
Figure 1 is a side view of my improved tool.
Figure 3:
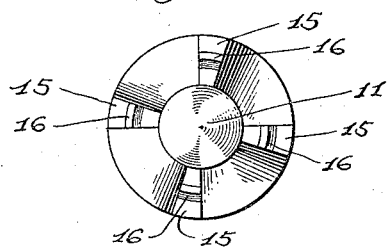
Fig. 3 is an end view of the operating face thereof.
Figure 4:
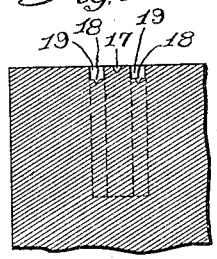
Fig. 4 is a reduced sectional view of a block of steel showing the main and supplemental channels cut by the tool and also the depression formed by the center punch.
Figure 2:
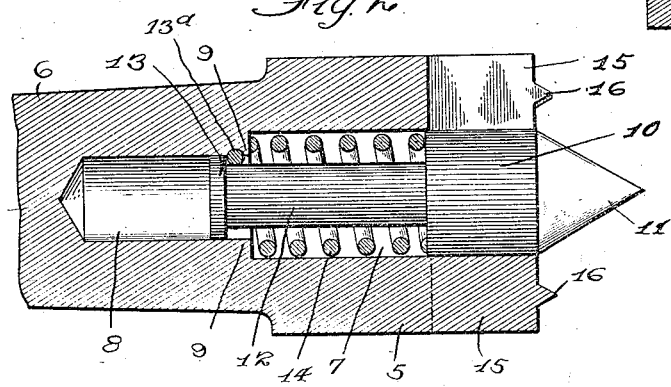
Fig. 2 is a partial longitudinal vertical section thereof.

Referring now to the drawings for a more particular description of the embodiment of my invention therein illustrated, 5 indicates the head of the tool, and 6 its stem or shank by which it is mounted in a drill press or other suitable machine. As best shown in Fig. 2, the head 5 is provided with a longitudinally-extending central recess 7, the inner portion of which is of reduced diameter, as shown at 8 in Fig. 2, forming a shoulder 9. Mounted in this recess is a centering pin 10 having a pointed end 11 and a stem 12 which extends into the reduced portion 8 of the recess, its inner end being provided with a collar 13. 13ª indicates a stop which limits the outward movement of the centering pin by its engagement with the collar 13. 14 indicates a spring mounted on the stem 12 and bearing against the shoulder 9 at one end and against the body of the pin 10 at the other end so that it tends to project the point beyond the operating face of the tool. Arranged around the pin 10 are main cutting teeth 15, preferably four in number, as shown in Figs. 1 and 3, the cutting edges of the teeth being at the end of the tool. 16 indicates auxiliary teeth, preferably triangular in cross-section, which are mounted upon the cutting faces of the main teeth 15 and project therefrom, as shown in the drawings. These auxiliary or supplementary teeth are preferably disposed centrally of the main teeth, and their function is to preliminarily cut a channel in the material operated upon which will coöperate with the centering pin 10 to hold the tool against lateral deflection due to the roughness of the surface operated upon. The operation has already been described, but it may be well to state again that the point to be bored is first marked by a center punch, after which the tool is applied, the point of the centering pin 10 being placed in the place so marked. The tool is then pressed down upon the material so that the centering pin is forced back into its recess and the supplementary teeth 16 permitted to come in contact with the material to be bored. As the tool rotates, the supplementary teeth cut into the material, forming an annular groove in which they quickly embed themselves, so that then the tool is held against lateral deflection not only by the centering pin but also by the supplementary teeth. The main teeth then come into action and cut the main channel. The final result is shown in Fig. 4, in which 17 indicates the point marked by the center punch, 18 the channel cut by the supplementary teeth, and 19 the main channel. An ordinary hollow drill may then be applied and the core formed, as indicated by the dotted lines in Fig. 4.

That which I claim as my invention, and desire to secure by Letters Patent, is:—

1. A tool, comprising a head having a centering pin, a plurality of teeth adapted to cut an annular channel as the tool is rotated, and supplementary means carried by and projecting beyond said teeth for holding said head in position to maintain the concentricity of such channel with a predetermined axis.

2. A tool, comprising a head having a centering pin, a plurality of cutting teeth adapted to cut an annular channel as the tool is rotated, and supplementary teeth carried by and projecting beyond said teeth for holding said head in position to maintain the concentricity of such channel with a predetermined axis.

3. A tool, comprising a head having a centering pin, a plurality of teeth adapted to cut an annular channel as the tool is rotated, and V-shaped supplementary teeth mounted on and projecting beyond the first-mentioned teeth for holding said head in position to maintain the concentricity of such channel with a predetermined axis.

4. A tool, comprising a head having a central bore, a plurality of cutting teeth adapted to cut an annular channel as the tool is rotated, and supplementary teeth carried by and projecting beyond said cutting teeth for holding said head in position to maintain the concentricity of such channel with a predetermined axis.

CHARLES A. PALMGREN.